United States Patent
Deluca et al.

(10) Patent No.: US 10,742,432 B2
(45) Date of Patent: Aug. 11, 2020

(54) FACILITATING A USER IN JOINING A CONFERENCE CALL

(71) Applicant: International Business Machines Corporation, Armonk, NY (US)

(72) Inventors: Lisa Seacat Deluca, Baltimore, MD (US); Dana L. Price, Surf City, NC (US); Jenny Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 16/128,466

(22) Filed: Sep. 11, 2018

(65) Prior Publication Data

US 2020/0084056 A1    Mar. 12, 2020

(51) Int. Cl.
  *G06F 15/16* (2006.01)
  *H04L 12/18* (2006.01)

(52) U.S. Cl.
  CPC ...... *H04L 12/1818* (2013.01); *H04L 12/1822* (2013.01); *H04L 12/1895* (2013.01)

(58) Field of Classification Search
  CPC ............. H04L 12/1818; H04L 12/1822; H04L 12/1895
  See application file for complete search history.

(56) References Cited

U.S. PATENT DOCUMENTS

| | | |
|---|---|---|
| 8,218,750 B2 | 7/2012 | Boss et al. |
| 8,908,843 B2 | 12/2014 | Manor |
| 8,942,365 B2 | 1/2015 | Daye et al. |
| 9,602,558 B2 | 3/2017 | Bhan et al. |
| 2009/0220063 A1 | 9/2009 | Miller et al. |
| 2011/0051917 A1 | 3/2011 | Chen et al. |
| 2011/0268263 A1* | 11/2011 | Jones .................. H04M 3/563 379/202.01 |
| 2016/0277585 A1 | 9/2016 | Efrati et al. |
| 2016/0316174 A1* | 10/2016 | Whynot ................. H04L 49/35 |
| 2018/0012192 A1* | 1/2018 | Rosenberg ............ H04L 65/403 |

OTHER PUBLICATIONS

IBM, "Method for controlling access to consecutive teleconferences", IP.com Prior Art Database, Technical Disclosure IPCOM000178327D, Jan. 2009.

* cited by examiner

*Primary Examiner* — Normin Abedin
(74) *Attorney, Agent, or Firm* — North Shore Patents, P.C.; Joseph L. Acayan

(57) ABSTRACT

Embodiments generally relate to assisting a user in joining a conference call. In some embodiments, a method includes determining that a user who has a first conference call and a second conference call that are scheduled back-to-back, where the determining of the first conference call and the second conference call being scheduled back-to-back triggers an instruction to notify the user when to join the second conference call. The method further includes determining a threshold event associated with the second call, where the threshold event is based at least in part on one or more predetermined triggering criteria. The method further includes detecting that the first conference call is still in progress and the second conference call has begun. The method further includes detecting the threshold event. The method further includes notifying the user to join the second conference call in response to detection of an occurrence of the threshold event.

15 Claims, 5 Drawing Sheets

FACILITATING A USER IN JOINING A CONFERENCE CALL

BACKGROUND

Communication platforms enable users to communicate with each other in various collaboration activities such as conference calls. Often times, users find that their professional calendars are filled up with back-to-back conference calls. A problem with back-to-back conference calls is that a conference call scheduled at an earlier time can run over the scheduled time, and overlap with a conference call scheduled at a later time. It can be rude to leave people waiting for a conference call to start due to a prior conference call running over its allotted time. Also, when a user is actively participating in a conference call, it can be equally frustrating to drop from a valuable discussion to be on time for a second conference call only to find out it has not started yet. Conventional communication platforms do not address this problem.

SUMMARY

Disclosed herein is a method for assisting a user in joining a conference call, and system and computer program product as specified in the independent claims. Embodiments are given in the dependent claims. Embodiments can be freely combined with each other if they are not mutually exclusive.

In an embodiment, a method includes determining that a user who has a first conference call and a second conference call that are scheduled back-to-back, where the determining of the first conference call and the second conference call being scheduled back-to-back triggers an instruction to notify the user when to join the second conference call. The method further includes determining a threshold event associated with the second call, where the threshold event is based at least in part on one or more predetermined triggering criteria. The method further includes detecting that the first conference call is still in progress and the second conference call has begun. The method further includes detecting the threshold event. The method further includes notifying the user to join the second conference call in response to detection of an occurrence of the threshold event.

In another embodiment, the method further includes including determining the identity of the user, determining that the user is in the first conference call when still in progress, and determining that the user is not in the second conference after the second conference call has begun. In another aspect, the method further includes enabling the user to define one or more of the predetermined triggering criteria. In another aspect, the triggering criteria includes at least one criterion that at least one predetermined person indicated by the user joins the second conference call. In another aspect, the triggering criteria includes at least one criterion that a predefined threshold number of persons join the second conference call. In another aspect, the triggering criteria includes at least one criterion that a predefined topic of discussion begins during the second conference call.

DETAILED DESCRIPTION

Embodiments described herein facilitate a user who is currently in a conference call in joining a subsequent conference call at a desired time. Embodiments utilize technology indicators to alert the user on the first conference call that a second conference call is ready for him or her to join for participation. This is particularly helpful to the user when the user has back-to-back collaborative meetings.

In some embodiments, a system receives a command from a user who has a first conference call and a second conference call that are scheduled back-to-back, where the command includes an instruction to notify the user when to join the second conference call. The system further determines a threshold event associated with the second call, where the threshold event is based at least in part on one or more predetermined triggering criteria. As described in more detail herein, the threshold event may include at least one criterion that at least one predetermined person indicated by the user joins the second conference call. In another example, the threshold event may include at least one criterion that a predefined threshold number of persons join the second conference call. In another example, the threshold event includes at least one criterion that a predefined topic of discussion begins during the second call conference. The system then detects that the first conference call is still in progress and the second conference call has begun. When the system detects the threshold event, the system notifies the user to join the second conference call in response to detection of an occurrence of the threshold event.

Figure 1:
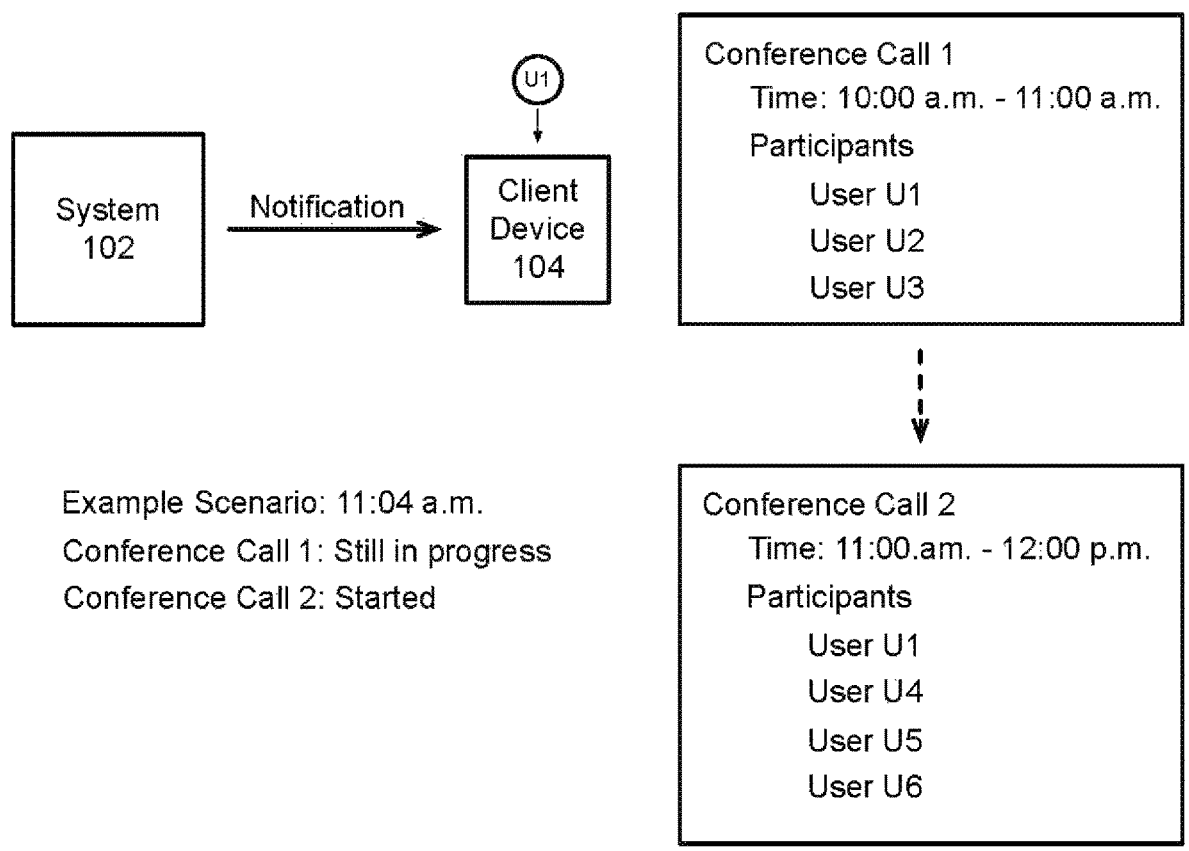
FIG. 1 is an example environment for assisting a user in joining a conference call, according to some embodiments.

FIG. 1 is an example environment 100 for assisting a user in joining a conference call, according to some embodiments. Shown is a system 102 and a client device 104, where system 102 facilitates user U1 in participating in conference calls with other users. As shown, user LT1 has a schedule of back-to-back meetings. For example, user LT1 has a conference call (labeled Conference Call 1) scheduled from 10:00 a.m. to 11:00 a.m. with user U2 and user U3. U1 has a subsequent conference call (labeled Conference Call 2) scheduled from 11:00 a.m. to 12:00 p.m. with user U4, user U5, and user U6.

In some embodiments, system 102 provides a platform for conference calls. In some embodiments, system 102 communicates with another system that provides a platform for conference calls, where system 102 accesses conference call information (e.g., scheduled conference calls, participants, etc.). In either of these embodiments, system 102 determines if two back-to-back conference calls overlap due to the prior conference call ending late.

In this example scenario, the time is 11:04 a.m. Conference Call 1 is still in progress, while Conference Call 2 has already started. User U1 is in a situation where user LT1 can leave the first conference call before it ends, and where user U1 is already late for the second conference call. Embodiments described herein address this problem.

Figure 2:
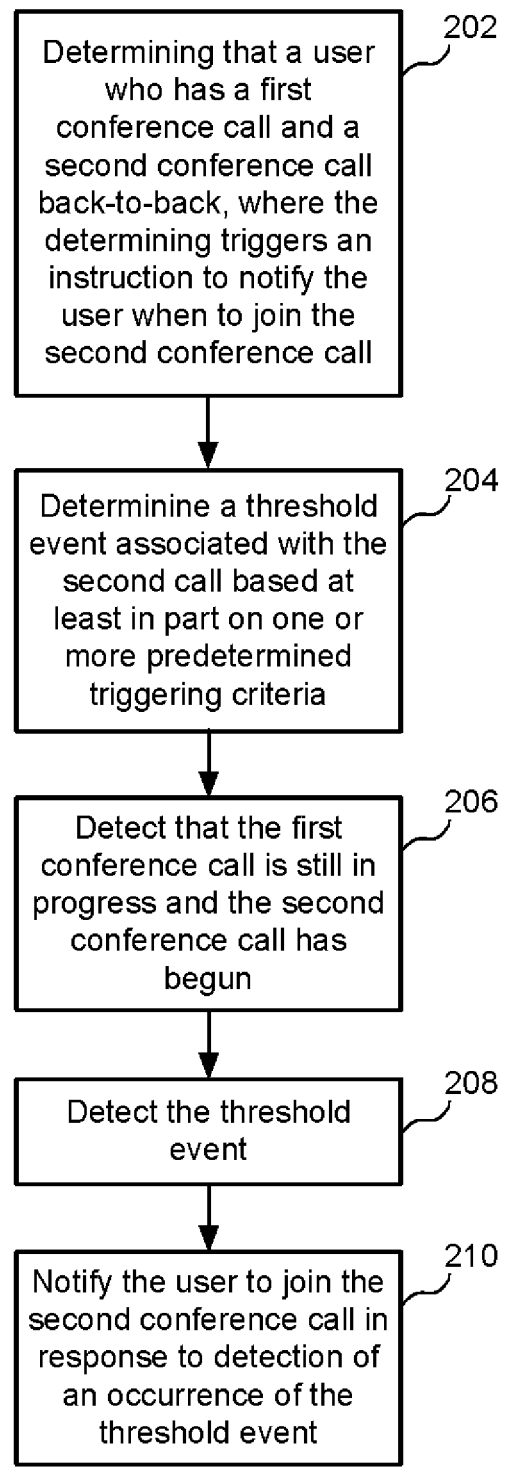
FIG. 2 is an example flow diagram for assisting a user in joining a conference call, according to some embodiments.

FIG. 2 is an example flow diagram for assisting a user in joining a conference call, according to some embodiments. Referring to both FIGS. 1 and 2, a method begins at block

202, where a system such as system 102 determining that a user who has a first conference call and a second conference call that are scheduled back-to-back (e.g., one meeting scheduled immediately after the other meeting). In various embodiments, the determining of the first conference call and the second conference call being scheduled back-to-back triggers an instruction to notify the user when to join the second conference call. The particular type of conference call may vary depending on the particular implementation. For example, the conference call may be a one-on-one phone call, multi-person call, a voice over Internet protocol (VoIP) call, a video call, etc.

Block 202 covers various scenarios. In an example scenario, the system automatically recognizes, without user intervention, when the first conference call and the second conference call are scheduled back-to-back. As such, the system notifies the user when to join the second conference call. For example, if the system recognizes that the second call participants have not really started to discuss the main topic, the system may analyze the content of the conversation (e.g., everyone has been talking about the weather, or everyone is still waiting for the VP to join, etc.) or the lack of conversation. When the system determines that the second call participants have started discussing the main topic, the system may then notify the user to join the second conference call. In some implementations, the system may first provide a recommendation to the user to notify the user when to join the second conference call. As such, the user may accept the recommendation to be notified, or the user may decline the recommendation to be notified. In another example scenario, the user may pre-define certain criteria or a threshold (such as "tell me to join the second call when Bob joins"). As such, the system monitors both calls and alerts the user when to join the second call.

At block 204, the system determines a threshold event associated with the second call, where the threshold event is based at least in part on one or more predetermined triggering criteria. For example, a triggering criterion may be that the second conference call begins. In another example, a triggering criterion may be that a particular person join the second conference call. Other triggering criteria are described in more detail herein.

In various embodiments, the system monitors the conversation activity of the second conference call, including when the second conference call starts. For example, the system may detect hold music. The system may detect particular words (e.g., "Welcome!", "Hello, who just joined?", "We'll get started in 5 minutes," "How's the weather in Florida?", etc.). The system may detect particular content/keywords in a discussion (e.g., "Let's get started, please take a look at the agenda."). The user may not want to join until a keyword is mentioned or a particular participant has joined. The system may detect requests for the presence of the user or mention of the user's name (e.g., "We're just waiting on Bob to join," etc.).

At block 206, the system detects that the first conference call is still in progress and the second conference call has begun. In various embodiments, the system determines the identity of the user. This may be base on several factors such as the user's phone number, the user's Internet protocol address if on a computer, etc. The system then determines that the user is in the first conference call when still in progress. The system then determines that the user is not in the second conference after the second conference call has begun.

At block 208, the system detects the threshold event. For example, the system may determine that the second conference call has started, and/or a particular person joins the second conference call, etc.

At block 210, the system notifies the user to join the second conference call in response to detection of an occurrence of the threshold event. The particular message and/or delivery may vary, depending on the particular implementation. For example, the system may make a beep sound to the user (e.g., call waiting to allow the user to quickly switch over). The system may announce, "Your second call has started," "Bob has joined the meeting," etc. The notification may be in the form of a message on the user's phone, an instant messaging (IM) message, a text message, an email, etc. In some embodiments, the system may switch the user to the second conference call. This may occur with or without an alert, depending on user preference.

As a result, the user may continue to engage with the participants on the first conference call while the system monitors the line for the second conference call. For example, the system may recognize hold music for a solid 8 minutes until the host/moderator finally joins. At that time, the system notifies/alerts the user that it is now time for him or her to switch over to his second conference call. As such, the user is happy, because the user is able to finish up the conversation in the first conference call without being late for the second conference call, or the user is not making the participants in the second conference call wait for the user's arrival. In some embodiments, the system may enable the user to remain in the first conference call, yet inform participants in the second conference call that the user is running late will join the second conference call in a few minutes, or other predetermined time period.

In some embodiments, the system may enable the moderator of the second conference call to enter a key combination to notify/alert users not in attendance that the call is ready to begin (e.g., sends an alert to users to join, etc.).

In some embodiments, the user may be invited to participate in two different meetings that are scheduled to overlap. For example, the first conference call may be schedule from 10:00 a.m. to 11:30 a.m., and the second conference call may be schedule from 11:00 a.m. to 12:00 p.m. To the user, theses conference calls are back-to-back even though they inherently overlap. The system will still notify the user when the second conference call starts.

In some embodiments, the system may enable the user to override the predetermined criteria if the first conversation runs over but the information being discussed when the call runs late is important and the user decides to miss the second conference call. In some embodiments, the system may enable to user to delay notifications while still in the first conference call. For example, the user may indicate to the system to notify the user in a predetermined time period (e.g., in 5 minutes, in 10 minutes, etc.).

In various embodiments, the system enables the user to define one or more of the predetermined triggering criteria for the threshold event. For example, the system may provide a drop-down menu with triggering criteria options. The particular criteria may vary, depending on the particular implementation. For example, in some embodiments, the triggering criteria may include the second conference call starting.

The particular criteria may vary, depending on the particular implementation. For example, in some embodiments, the triggering criteria includes at least one criterion that at least one predetermined person indicated by the user joins the second conference call. In various embodiments, the system recognizes the presence of participants in the second conference call. The presence of particular participants may be manually indicated in the meeting invite (e.g., required participants, optional participants, for-your-information (FYI) participants, etc.). The presence of particular participants may be indicated by the user (e.g., Mary wants to know when Bob joins). The presence of particular participants may be determined through techniques that match connected numbers/voices to participants.

In some embodiments, the triggering criteria may include at least one criterion that a predefined threshold number of persons join the second conference call. For example, the system may determine when a subset of participants are present in the second conference call. The system may determine a percentage of participants (e.g., 9 out of 10 participants, "waiting on participant X," etc.) currently in the second conference call.

In some embodiments, the triggering criteria may include at least one criterion that a predefined topic of discussion begins during the second call conference. For example, the system may determine that the conversation moves to the active discussion portion of the meeting where particular key words are mentioned.

In some embodiments, the triggering criteria includes at least one criterion that an urgency arises. For example, the system may monitor the conversation activity and execute a tone and sentiment analysis and/or speech-to-text analysis to determine any urgency where the user should drop the first conference call and join the second conference call. The tone and sentiment analysis may determine from voices in the second conference call if one or more participants are becoming impatient due to the user not being present. For example, the system may detect a participant say the user's name in an angry tone. Similarly, the system may use speech-to-text analysis to determine if the user's name is mentioned and if participants want the user to be present in the meeting. As such, the system may notify the user with an urgent message to join the second conference call.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
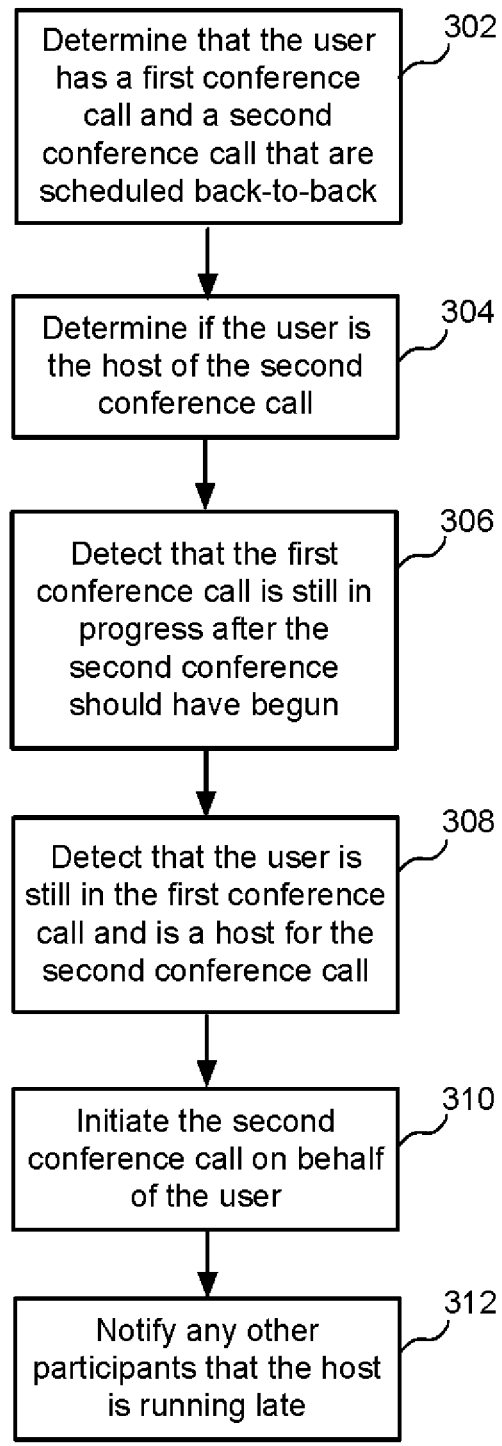
FIG. 3 is an example flow diagram for initiating a conference call on behalf of a user, according to some embodiments.

FIG. 3 is an example flow diagram for initiating a conference call on behalf of a user, according to some embodiments. Referring to both FIGS. 1 and 2, a method begins at block 302, where a system such as system 102 determines that the user has a first conference call and a second conference call that are scheduled back-to-back.

At block 304, the system determines that the user is the host of the second conference call. In this scenario where the user is the host of the second conference call, if the first conference call runs over time and the user is late for the second conference call, an embodiment prevents other participants from having to wait for the user to become available.

At block 306, the system detects that the first conference call is still in progress after the second conference should have begun. The system may determine this based at least in part on the scheduled end time of the first conference call and scheduled start time of the second conference call.

At block 308, the system detects that the user is still in the first conference call and is a host for the second conference call. For example, the system detects that the user has not hung up/exited the first conference call. Also, because the user is the host of the second conference call, the system detects that the user has not initiated the second conference call.

At block 310, the system initiates the second conference call on behalf of the user. This enables the other participants to join the second conference call even if the user/host is still in the first conference call (not yet available).

At block 312, the system notifies any other participants that the host is running late. This enables the other participants to proceed with the meeting without the host. This enables the user/host to remain in the first conference call for a longer time, or until it ends. In some embodiments, the system may enable the user to indicate any additional messages to convey to the other participants. For example, based on user preferences, the system may indicate to the other users to start the conference call without the host. In another example, based on user preferences, the system may indicate to the other users to start the conference call without the host, but to hold off discussing a particular topic until the host joins the meeting.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 4:
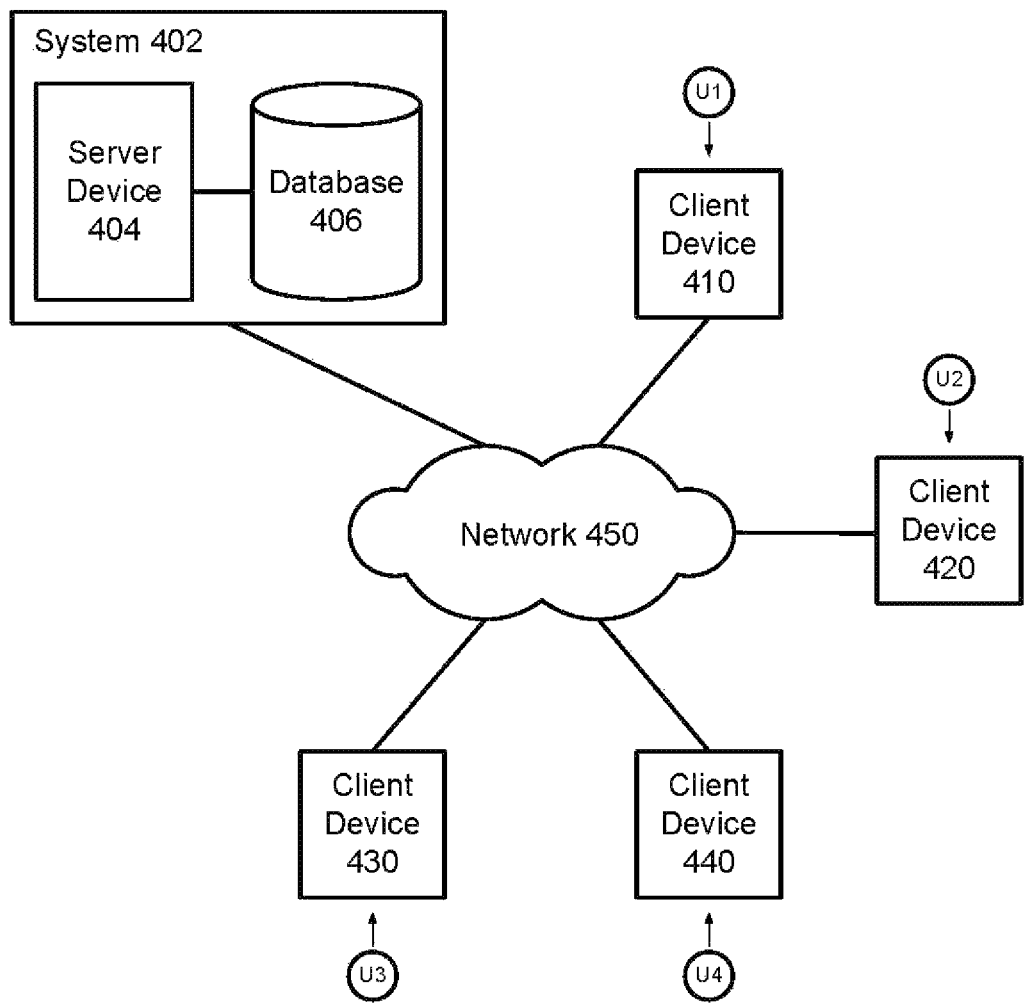
FIG. 4 illustrates a block diagram of an example network environment, which may be used for some implementations described herein.

FIG. 4 illustrates a block diagram of an example network environment 400, which may be used for some implementations described herein. Shown is a system 402, which includes a server device 404 and a database 406. In some implementations, system 402 facilitates users U1, U2, U3, U4, etc. in communicating with system 402, and with each other in conference calls and other communication platforms via their respective client devices 410, 420, 430, 440, etc., via network 450 and/or any suitable network or combination of networks. System 402 of FIG. 4 may be used to implement system 102 of FIG. 1. Also, client device 410 FIG. 4 may be used to implement client device 104 of FIG. 1.

In some embodiments, system 402 provides a platform for conference calls. In some embodiments, system 402 communicates with another system that provides a platform for conference calls, where system 402 accesses conference call information (e.g., scheduled conference calls, participants, etc.).

For ease of illustration, FIG. 4 shows one block for each of system 402, server device 404, and database 406, and shows four blocks for client devices 410, 420, 430, and 440. Blocks 402, 404, and 406 may represent multiple systems, server devices, and databases. Also, there may be any number of client devices. In other implementations, environment 400 may not have all of the components shown and/or may have other elements including other types of elements instead of, or in addition to, those shown herein.

While the server 402 performs embodiments described herein, in other embodiments, any suitable component or combination of components associated with the server 402 or any suitable processor or processors associated with the server 402 may facilitate performing the embodiments described herein. In various embodiments, the environment 400 may not have all of the components shown and/or may have other elements including other types of components instead of, or in addition to, those shown herein.

Figure 5:
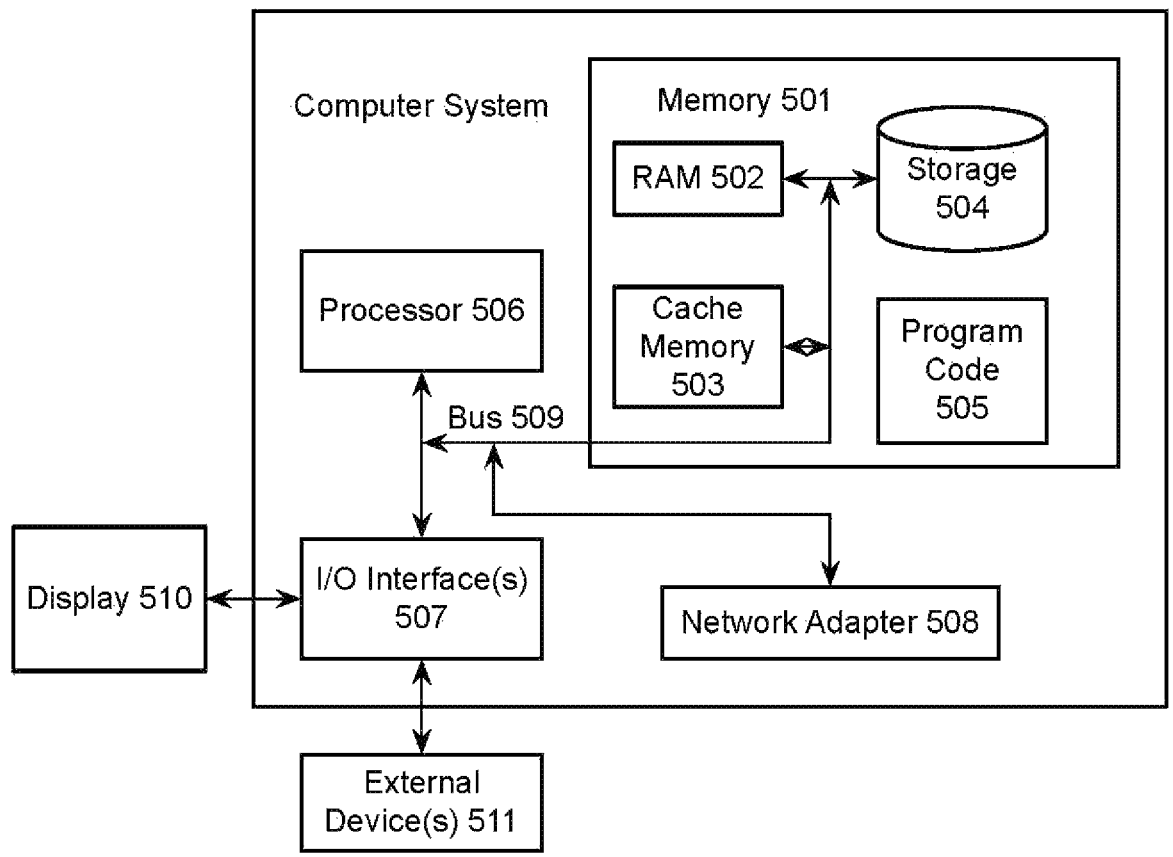
FIG. 5 is a block diagram of an example computer system, which may be used for embodiments described herein.

FIG. 5 is a block diagram of an example computer system 500, which may be used for embodiments described herein. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module such as program code 505 that are configured to carry out the functions of embodiment of the present invention when executed by the processor 506. The computer system 500 may also communicate with a display 510 or one or more other external devices 511 via input/output (I/O) interfaces 507. The computer system 500 may communicate with one or more networks via network adapter 508.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by the at least one processor to cause the at least one processor to perform operations comprising:
   determining that a user who has a first conference call and a second conference call that are scheduled back-to-back, wherein the determining of the first conference call and the second conference call being scheduled back-to-back triggers an instruction to notify the user when to join the second conference call;
   determining that the user is a host of the second conference call;
   initiating the second conference call on behalf of the uses;
   notifying any other participants that the host is running late;
   determining a threshold event associated with the second call wherein the threshold event is based at least in part on one or more predetermined triggering criteria, and wherein the one or more predetermined triggering criteria comprises at least one criterion that a predefined threshold number of participants join the second conference call;
   detecting that the first conference call is still in progress and the second conference call has begun;
   detecting the threshold event; and
   notifying the user to join the second conference call in response to detection of an occurrence of the threshold event.

2. The system of claim 1, wherein the at least one processor further performs operations comprising:
   determining the identity of the user;
   determining that the user is in the first conference call when still in progress; and
   determining that the user is not in the second conference after the second conference call has begun.

3. The system of claim 1, wherein the at least one processor further performs operations comprising enabling the user to define one or more of the predetermined triggering criteria.

4. The system of claim 1, wherein the triggering criteria includes at least one criterion that at least one predetermined person indicated by the user joins the second conference call.

5. The system of claim 1, wherein the triggering criteria includes at least one criterion that a predefined topic of discussion begins during the second conference call.

6. A computer program product comprising a computer readable storage medium having program instructions embodied therewith, the program instructions executable by at least one processor to cause the at least one processor to perform operations comprising:
   determining that a user who has a first conference call and a second conference call that are scheduled back-to-back, wherein the determining of the first conference call and the second conference call being scheduled back-to-back triggers an instruction to notify the user when to join the second conference call;
   determining that the user is a host of the second conference call;
   initiating the second conference call on behalf of the user;
   notifying any other participants that the host is running late;
   determining a threshold event associated with the second call, wherein the threshold event is based at least in part on one or more predetermined triggering criteria, and wherein the one or more predetermined triggering criteria comprises at least one criterion that a predefined threshold number of participants join the second conference call;
   detecting that the first conference call is still in progress and the second conference call has begun;
   detecting the threshold event; and
   notifying the user to join the second conference call in response to detection of an occurrence of the threshold event.

7. The computer program product of claim 6, wherein the at least one processor further performs operations comprising:
   determining the identity of the user;
   determining that the user is in the first conference call when still in progress; and
   determining that the user is not in the second conference after the second conference call has begun.

8. The computer program product of claim 6, wherein the at least one processor further performs operations comprising enabling the user to define one or more of the predetermined triggering criteria.

9. The computer program product of claim 6, wherein the triggering criteria includes at least one criterion that at least one predetermined person indicated by the user joins the second conference call.

10. The computer program product of claim 6, wherein the triggering criteria includes at least one criterion that a predefined topic of discussion begins during the second conference call.

11. A computer-implemented method for assisting a user in joining, a conference call, the method comprising:

determining that a user who has a first conference call and a second conference call that are scheduled back-to-back, wherein the determining of the first conference call and the second conference call being scheduled back-to-back triggers an instruction to notify the user when to join the second conference call;

determining that the user is a host, of the second conference call;

initiating the second conference call on behalf of the user;

notifying any other participants that the host is running late;

determining a threshold event associated with the second call, wherein the threshold event is based at least in, part on one or more predetermined triggering criteria, and wherein the one or more predetermined triggering criteria comprises at least one criterion that a predefined threshold number of participants join the second conference call;

detecting that the first conference call is still in progress and the second conference call has begun;

detecting, the threshold event; and notifying the user to join the second conference call in response to detection of an occurrence of the threshold event.

12. The method of claim 11, further comprising:
determining the identity of the user;
determining that the user is in the first conference call when still in progress; and
determining that the user is not in the second conference after the second conference call has begun.

13. The method of claim 11, wherein the at least one processor further performs operations comprising enabling the user to define one or more of the predetermined triggering criteria.

14. The method of claim 11, wherein the triggering criteria includes at least one criterion that at least one predetermined person indicated by the user joins the second conference call.

15. The method of claim 11, wherein the triggering criteria includes at least one criterion that a predefined topic of discussion begins during the second conference call.

* * * * *